(12) United States Patent
Benjamin et al.

(10) Patent No.: US 11,875,296 B2
(45) Date of Patent: Jan. 16, 2024

(54) OPTIMIZING BUILDING DESIGN AND ARCHITECTURE FOR SUSTAINABILITY CERTIFICATION

(71) Applicant: AUTODESK, INC., San Francisco, CA (US)

(72) Inventors: David Benjamin, Brooklyn, NY (US); Damon Lau, New York, NY (US); James Stoddart, Atlanta, GA (US); Lorenzo Villaggi, Brooklyn, NY (US); Rui Wang, New York, NY (US); Lindsey Wikstrom, West New York, NJ (US)

(73) Assignee: AUTODESK, INC., San Francisco, CA (US)

( * ) Notice: Subject to any disclaimer, the term of this patent is extended or adjusted under 35 U.S.C. 154(b) by 206 days.

(21) Appl. No.: 17/098,280

(22) Filed: Nov. 13, 2020

(65) Prior Publication Data

US 2021/0150089 A1    May 20, 2021

Related U.S. Application Data

(60) Provisional application No. 62/937,190, filed on Nov. 18, 2019.

(51) Int. Cl.
*G06Q 10/0639* (2023.01)
*G06Q 10/0633* (2023.01)
(Continued)

(52) U.S. Cl.
CPC ... *G06Q 10/06393* (2013.01); *G06F 16/9024* (2019.01); *G06F 30/13* (2020.01);
(Continued)

(58) Field of Classification Search
CPC ........... G06Q 10/06393; G06Q 10/047; G06Q 10/0633; G06Q 10/06375;
(Continued)

(56) References Cited

U.S. PATENT DOCUMENTS

| 8,005,656 | B1 | 8/2011 | Ankory et al. |
| 8,229,176 | B2 | 7/2012 | Seegers et al. |

(Continued)

FOREIGN PATENT DOCUMENTS

KR    20150125457 A    * 11/2015

OTHER PUBLICATIONS

Azhar, Salman, et al. "Building information modeling for sustainable design and LEED® rating analysis." Automation in construction 20.2 (2011): 217-224. (Year: 2010).*

(Continued)

*Primary Examiner* — Brian S Cook
(74) *Attorney, Agent, or Firm* — Artegis Law Group, LLP

(57) ABSTRACT

Various embodiments set forth systems and techniques for assessing sustainability of a building design. The techniques include receiving a building design for a budding and sustainability certification data describing a plurality of sustainability certification systems; selecting one or more particular sustainability certification systems from the plurality of sustainability certification systems; computing a respective sustainability certification value for each sustainability certification system of the one or more particular sustainability certification systems; and performing one or more building design operations based on sustainability certification system values for the one or more particular sustainability certification systems.

23 Claims, 4 Drawing Sheets

(51) Int. Cl.

| | | |
|---|---|---|
| *G06Q 10/047* | (2023.01) | |
| *G06F 30/13* | (2020.01) | |
| *G06Q 10/101* | (2023.01) | |
| *G06F 16/901* | (2019.01) | |
| *G06Q 50/16* | (2012.01) | |
| *G06F 30/20* | (2020.01) | |
| *G06F 30/28* | (2020.01) | |
| *G06Q 10/0637* | (2023.01) | |
| *G06Q 10/067* | (2023.01) | |
| *G06F 30/18* | (2020.01) | |
| *G06Q 50/08* | (2012.01) | |
| *G06T 17/20* | (2006.01) | |
| *G06F 111/04* | (2020.01) | |
| *G06F 111/02* | (2020.01) | |
| *G06F 111/10* | (2020.01) | |
| *G06F 119/02* | (2020.01) | |

(52) U.S. Cl.
CPC .............. *G06F 30/18* (2020.01); *G06F 30/20* (2020.01); *G06F 30/28* (2020.01); *G06Q 10/047* (2013.01); *G06Q 10/067* (2013.01); *G06Q 10/0633* (2013.01); *G06Q 10/06375* (2013.01); *G06Q 10/06395* (2013.01); *G06Q 10/101* (2013.01); *G06Q 50/08* (2013.01); *G06Q 50/163* (2013.01); *G06Q 50/165* (2013.01); *G06F 2111/02* (2020.01); *G06F 2111/04* (2020.01); *G06F 2111/10* (2020.01); *G06F 2119/02* (2020.01); *G06T 17/20* (2013.01)

(58) Field of Classification Search
CPC ........... G06Q 10/06395; G06Q 10/067; G06Q 10/101; G06Q 50/08; G06Q 50/163; G06Q 50/165; G06F 16/9024; G06F 30/13; G06F 30/18; G06F 30/20; G06F 30/28; G06F 2111/02; G06F 2111/04; G06F 2111/10; G06F 2119/02; G06F 30/12; G06F 2111/00; G06F 2111/06; G06F 2111/08; G06F 2111/12; G06F 2111/14; G06F 2111/16; G06F 2111/18; G06F 2111/20; G06F 2113/00; G06F 2113/02; G06F 2113/04; G06F 2113/06; G06F 2113/08; G06F 2113/10; G06F 2113/12; G06F 2113/14; G06F 2113/16; G06F 2113/18; G06F 2113/20; G06F 2113/22; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/04; G06F 2119/06; G06F 2119/08; G06F 2119/10; G06F 2119/12; G06F 2119/14; G06F 2119/16; G06F 2119/18; G06F 2119/20; G06F 2119/22; G06F 30/25; G06F 30/27; G06T 17/20
USPC .......................................................... 703/1
See application file for complete search history.

(56) References Cited

U.S. PATENT DOCUMENTS

| | | |
|---|---|---|
| 8,594,701 B2 | 11/2013 | Pakzad |
| 8,744,812 B2 | 6/2014 | Cruz |
| 9,285,227 B1 | 3/2016 | Chao et al. |
| 9,501,805 B2 | 11/2016 | McLean |
| 10,387,811 B2 | 8/2019 | Carnevale et al. |
| 10,691,081 B2 | 6/2020 | Ray et al. |
| 10,831,941 B2 | 11/2020 | Desai et al. |
| 10,917,740 B1 | 2/2021 | Scott et al. |
| 10,943,210 B2 | 3/2021 | Hance et al. |
| 11,209,798 B1 | 12/2021 | Michalowski et al. |
| 11,263,363 B2 | 3/2022 | Gifford |
| 11,271,222 B2 | 3/2022 | Dede et al. |
| 11,272,316 B2 | 3/2022 | Scott et al. |
| 2004/0034555 A1 | 2/2004 | Dismukes et al. |
| 2004/0078257 A1 | 4/2004 | Schweitzer et al. |
| 2004/0113945 A1 | 6/2004 | Park et al. |
| 2006/0217876 A1 | 9/2006 | Houri et al. |
| 2009/0300174 A1 | 12/2009 | Floris et al. |
| 2010/0198563 A1 | 8/2010 | Plewe |
| 2010/0218131 A1 | 8/2010 | Holm-Petersen et al. |
| 2012/0072181 A1 | 3/2012 | Imani |
| 2012/0096417 A1 | 4/2012 | Durbha et al. |
| 2013/0073344 A1 | 3/2013 | Parent |
| 2013/0197799 A1 | 8/2013 | Cho et al. |
| 2014/0278280 A1* | 9/2014 | Pardo-Fernandez .... G06F 30/13 703/1 |
| 2016/0012357 A1 | 1/2016 | Wood |
| 2016/0012359 A1 | 1/2016 | Wood |
| 2016/0161263 A1 | 6/2016 | Patel |
| 2018/0047121 A1 | 2/2018 | Bhattacharyya |
| 2018/0068255 A1 | 3/2018 | Hance et al. |
| 2018/0094936 A1 | 4/2018 | Jones et al. |
| 2018/0137214 A1 | 5/2018 | Benjamin et al. |
| 2018/0288850 A1 | 10/2018 | Kumar et al. |
| 2018/0300435 A1 | 10/2018 | Eckman et al. |
| 2018/0364719 A1 | 12/2018 | Wang et al. |
| 2018/0365347 A1 | 12/2018 | Wang et al. |
| 2019/0026949 A1 | 1/2019 | Alabastro et al. |
| 2019/0102486 A1 | 4/2019 | Desai et al. |
| 2019/0188338 A1 | 6/2019 | Srivastava et al. |
| 2019/0347367 A1 | 11/2019 | Livnat |
| 2019/0354641 A1 | 11/2019 | Masoud et al. |
| 2020/0034503 A1 | 1/2020 | Livnat |
| 2020/0104431 A1 | 4/2020 | Ginsberg |
| 2020/0272956 A1 | 8/2020 | Livnat |
| 2020/0311320 A1 | 10/2020 | Wang et al. |
| 2021/0073449 A1 | 3/2021 | Segev et al. |
| 2022/0007601 A1 | 1/2022 | Coffin et al. |

OTHER PUBLICATIONS

International Search Report for application No. PCT/US2020/060861 dated Feb. 11, 2021.
Non Final Office Action received for U.S. Appl. No. 17/098,214 dated Feb. 18, 2022, 23 pages.
Rubin, Arthur., "Office Design Measurements for Productivity—A Research Overview", U.S. Department of Commerce, Dec. 1987, 78 pages.
Ranne et al., "People Flow Experience in Offices", A handbook for planning office spaces Kone Corporation, 2017, 24 pages.
Autodesk, "Factory Design Suite 2011", Accelerate your Factory Layout Process, 2011, 4 pages.
Tachikawa et al., "Office Layout Support System using Genetic Algorithm—Generation of Layout Plans for Polygonal Space—", 2010 Second World Congress on Nature and Bilogically Inspired Computer, Dec. 15-17, 2010, pp. 280-285.
Li et al., "A Constraint Based Generative System for Floor Layout Computer Science", 2000, pp. 417-426.
Anderson et al., "Augmented Space Planning: Using Procedural Generation to Automate Desk Layouts", International Journal of Architectural Computing, vol. 16, No. 2, 2018, pp. 164-177.
Non Final Office Action received for U.S. Appl. No. 17/098,282 dated Mar. 17, 2022, 18 pages.
Final Office Action received for U.S. Appl. No. 17/098,214 dated Jun. 1, 2022, 40 pages.
Dorismond, Jessica, "Supermarket Optimization: Simulation Modeling and Analysis of a Grocery Store Layout", University at Buffalo, State University of New York, 2016, pp. 3656-3657.

(56) References Cited

OTHER PUBLICATIONS

Ozgormus, Elif, "Optimization of Block Layout for Grocery Stores", Auburn University, 2015, pp. 134 pages.
Bhadury et al., "Store Layout Using Location Modeling to Increase Purchases", University of North Carolina at Greensboro, 2016, pp. 1-32.
Non Final Office Action received for U.S. Appl. No. 17/098,214 dated Sep. 19, 2022, 24 pages.
Seppanen et al., "Facilities Planning with Graph Theory", Management Science, vol. 17, No. 4, Dec. 1970, pp. B-242-B253.
Nagy, Danil, "Routing with graphs", Generative Design, Mar. 2, 2018, 14 pages.
Liggett, Robin S., "Automated facilities layout: past, present and future" Automation in Construction, vol. 9, 2000, pp. 197-215.
Homayouni, Hoda, "A Survey of Computational Approaches to Space Layout Planning (1965-2000)", 2007, 18 pages.
Bahrehmand et al., "Optimizing Layout using Spatial Quality Metrics and User Preferences", Graphical Models, vol. 93, 2017, pp. 25-38.
Watson, Kelvin, "Graph Theoretic Facility Layout Design and Evaluation: Theoretical and Practical Considerations", Jan. 1996, 369 pages.
Non Final Office Action received for U.S. Appl. No. 17/098,287 dated Aug. 22, 2022, 45 pages.
Bassett et al., "Municipal Zoning Enabling Act", Floor Area Ratio, Jun. 1958, 28 pages.
Osman et al., "A Hybrid CAD-based Construction Site Layout Planning System using Genetic Algorithms", Automation in construction, vol. 12, No. 6, 2003, pp. 749-764.
Final Office Action received for U.S. Appl. No. 17/098,282 dated Aug. 5, 2022, 27 pages.
Murakami et al. "Coupled Simulations of indoor-outdoor flow fields for cross-ventilation of a building in a simplified urban array", Atmosphere, vol. 9, Jun. 4, 2018, 16 pages.
Chen et al., "Numerical Simulations of Noise Induced by Flow in HVAC Ventilation Ducts", SAE International Journal of Materials and Manufacturing, vol. 4, No. 1, 2011, pp. 696-707.
Non Final Office Action received for U.S. Appl. No. 17/098,291 dated Sep. 16, 2022, 60 pages.
Flack et al., "Evolution of Architectural Floor Plans", European conference on the applications of evolutionary computation, 2011, pp. 313-322.
Cascio et al., "Residential Building Retrofit through Numerical Simulation: A Case Study", Energy Procedia, vol. 111, 2017, pp. 91-100.
Koenig et al., "Comparing two evolutionary algorithm based methods for layout generation: Dense packing versus subdivision", AI EDAM, vol. 28, No. 3, 2014, pp. 285-299.
Almhafdy et al., "Courtyard Design Variants and Microclimate Performance", Procedia—Social and Behavioral Sciences, https://doi.org/10.1016/j.sbspro.2013.07.190, vol. 101, 2013, pp. 170-180.
Notice of Allowance received for U.S. Appl. No. 17/098,282 dated Oct. 20, 2022, 13 pages.
Final Office Action received for U.S. Appl. No. 17/098,287 dated Dec. 2, 2022, 34 pages.
Final Office Action received for U.S. Appl. No. 17/098,214 dated Jan. 9, 2023, 33 pages.
Final Office Action received for U.S. Appl. No. 17/098,291 dated Jan. 26, 2023, 46 pages.
Non Final Office Action received for U.S. Appl. No. 17/098,214 dated Apr. 17, 2023, 35 pages.
Non Final Office Action received for U.S. Appl. No. 17/098,228 dated Mar. 23, 2023, 65 pages.
Soltani et al., "A fuzzy based multi-objective path planning of construction sites", Automation in Construction, vol. 13, No. 6, 2004, pp. 717-734.
Final Office Action received for U.S. Appl. No. 17/098,214 dated Jul. 26, 2023, 26 pages.
Notice of Allowance received for U.S. Appl. No. 17/098,287 dated Jul. 11, 2023, 13 pages.
Final Office Action received for U.S. Appl. No. 17/098,228 dated Aug. 14, 2023, 49 pages.
Non Final Office Action received for U.S. Appl. No. 17/098,291 dated Aug. 23, 2023, 41 pages.

\* cited by examiner

OPTIMIZING BUILDING DESIGN AND ARCHITECTURE FOR SUSTAINABILITY CERTIFICATION

CROSS-REFERENCE TO RELATED APPLICATIONS

This application claims the priority benefit of U.S. Provisional Patent Application titled: "Computer-Implemented Techniques for Designing Factories and Workspaces," and filed on Nov. 18, 2019 having Ser. No. 62/937,190. The subject matter of this related application is hereby incorporated by reference.

BACKGROUND

Field of the Various Embodiments

The present invention relates generally to computer science and computer-aided design and, more specifically, to computer-implemented techniques for optimizing architecture design for sustainability certification.

Description of the Related Art

Generating a building design and layout, such as for a building or workplace, oftentimes is a complex process where many different design goals as well as numerous constraints and requirements must be considered. For example, when designing a building or other similarly intricate industrial building, a designer has to consider, among other things, operating requirements, production requirements, architectural and engineering constraints, cost constraints, and building site constraints.

With respect to operating requirements, the design often needs to satisfy the requirements of sustainability certification systems. Sustainability certification systems are a set of rating systems that are used to assess a building or other construction project's performance in terms of sustainability and/or environmental performance. Each sustainability certification may have different levels that can be achieved, e.g. platinum, gold, or silver; outstanding, excellent, or good, and different requirements for achieving each level. When designing a building, such as a factory or workspace, the building design, layout, and materials affect the sustainability certification level that can be achieved.

One drawback to using conventional CAD software when designing industrial buildings is that much of the information needed to properly model and simulate the characteristics of a budding with respect to sustainability qualification is not available or ascertainable until after the budding has been constructed. Thus, metrics and measurements cannot be used to evaluate how different elements of the building design and layout meet the sustainability qualifications. Thus, design optimization components in the design analysis process cannot incorporate such data into the analysis. Such gaps in data result in building designs that may not satisfy the standards of certain sustainability certification systems. As a result, generating layouts for an industrial building using conventional CAD software involves an ad-hoc trial-and-error approach.

As the foregoing illustrates, what is needed in the art are more effective techniques for optimizing a design of a building that accounts for sustainability certification levels.

SUMMARY

One embodiment of the present application sets forth a computer-implemented method for evaluating sustainability certification levels for a building design. The method includes receiving a building design for a building and sustainability certification data describing a plurality of sustainability certification systems; selecting one or more particular sustainability certification systems from the plurality of sustainability certification systems; computing a respective sustainability certification value for each sustainability certification system of the one or more particular sustainability certification systems; and performing one or more building design operations based on sustainability certification system values for the one or more particular sustainability certification systems.

At least one technical advantage of the disclosed techniques relative to the prior art is that the disclosed techniques can be incorporated into a CAD application to enable the CAD application to automatically explore a design space to identify building layouts that optimize for sustainability characteristics. Accordingly, with the disclosed techniques, a CAD application can generate a substantially larger number of building designs that, for example, are optimized for sustainability, relative to a conventional CAD application. This functionality, which is not available in conventional CAD applications, increases the likelihood that an optimal layout design can be automatically generated and identified for a given building design. These technical advantages represent one or more tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
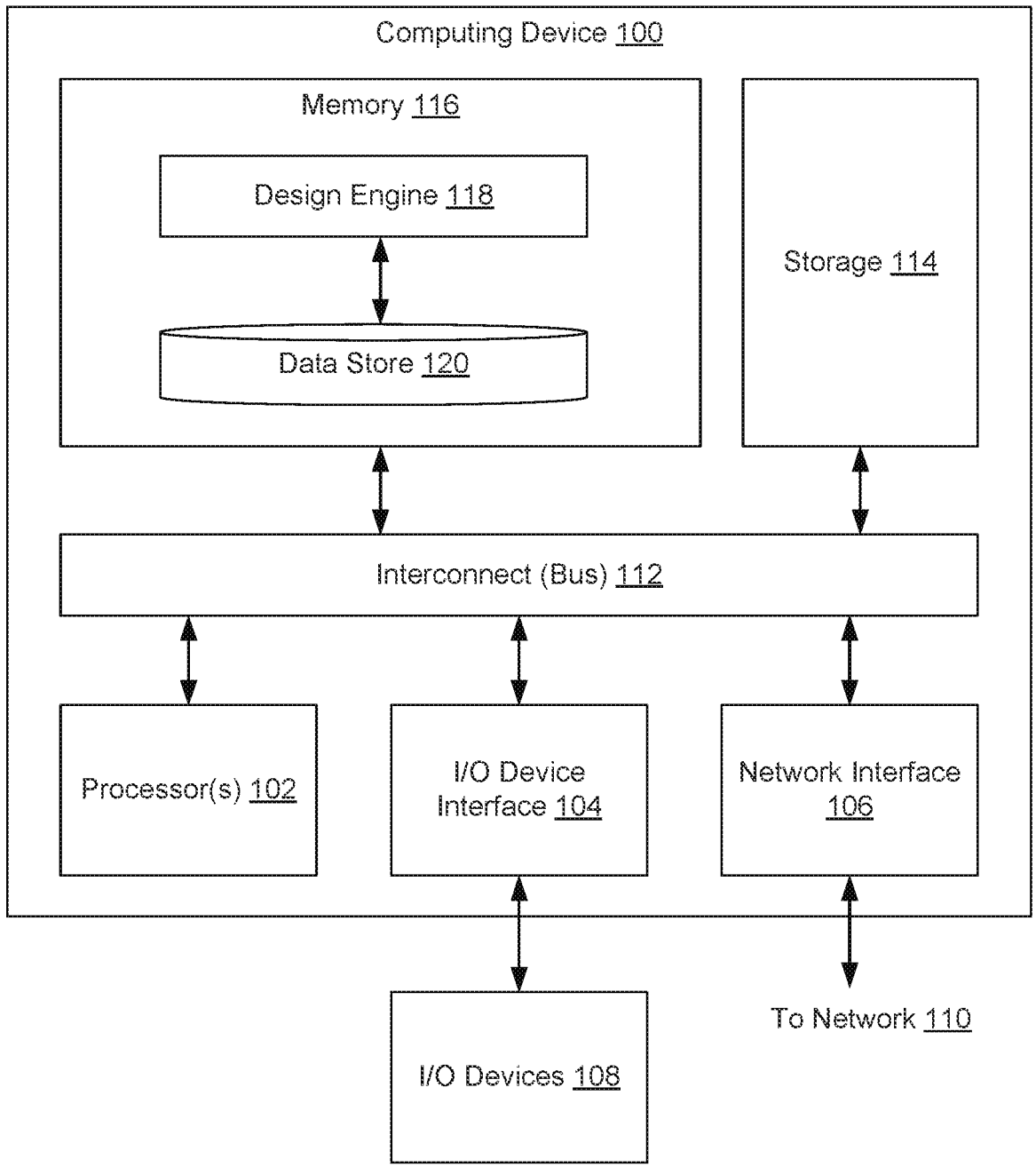
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Design engine 118 and data store 120 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including design engine 118 and data store 120. Design engine 118 and data store 120 are described in further detail below with respect to FIG. 2.

In operation, design engine 118 is configured to design and optimize buildings such as factories or other workplaces. Design engine 118 receives input from data store 120 that describes various aspects of the building being designed, such as a site on which the building is to be built, operations to be performed in the building, and various other constraints and requirements for the building. Design engine 118 generates a spectrum of potential building designs based on the received input. A building design may include for example, a building footprint; building geometry such as a floorplan and/or a three-dimensional model of the building; a layout of rooms, systems, infrastructure, and other elements of the budding; and a layout of the budding within a site, such as a location and/or orientation of the building in the site, Design engine 118 evaluates the generated designs based on various criteria. Design engine 118 uses the results of the evaluation to further optimize and refine the generated designs to produce additional building designs. Additionally, design engine 118 presents the results of the evaluation to an end user. Design engine 118 implements various software modules in order to generate and optimize building designs. These software modules are discussed in greater detail below in conjunction with FIG. 2.

Figure 2:
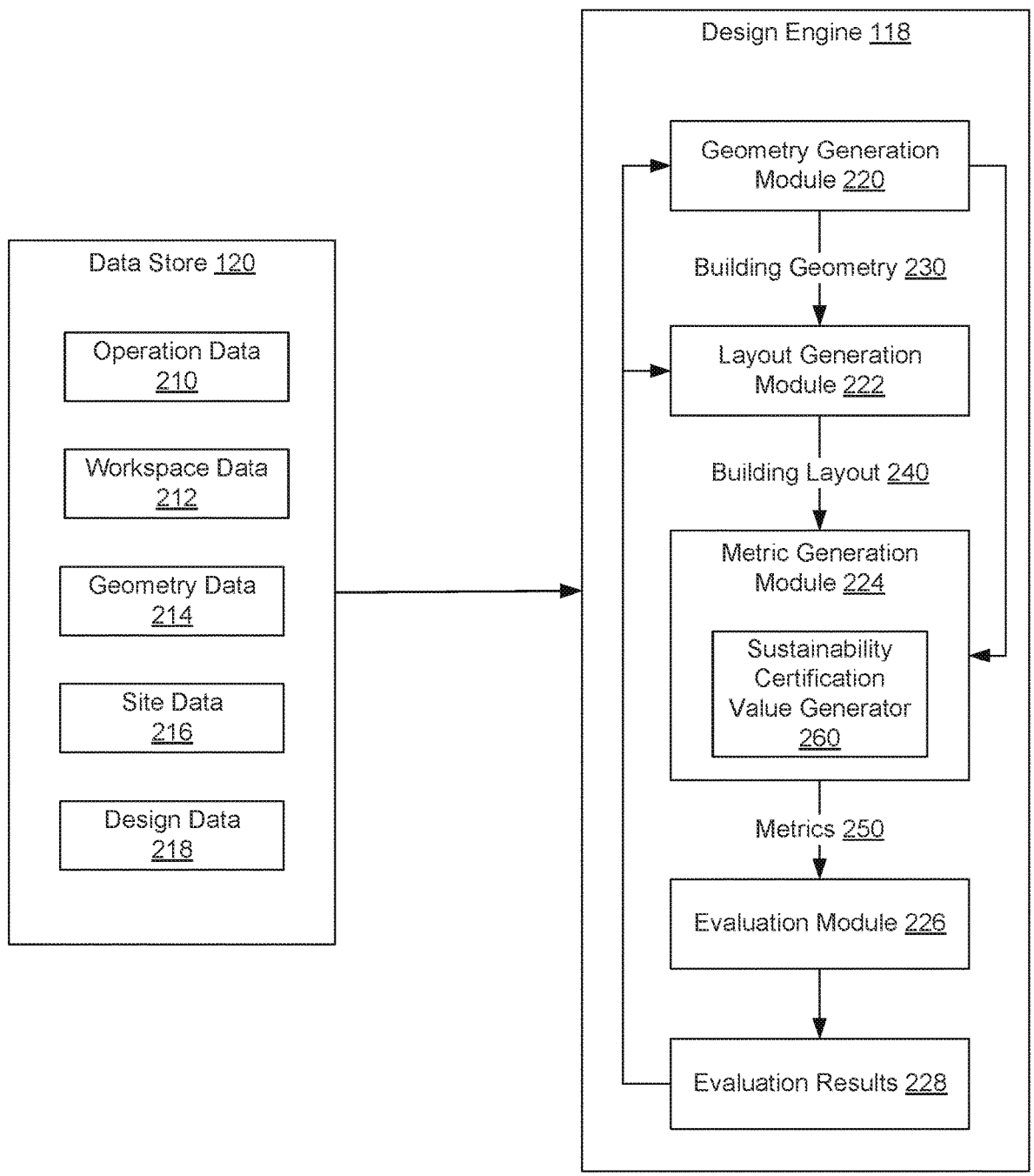
FIG. 2 is a more detailed illustration of the data store and design engine of FIG. 1, according to various embodiments of the present disclosure.

FIG. 2 is a more detailed illustration of design engine 118 and data store 120 of FIG. 1, according to various embodiments of the present disclosure. As shown, design engine 118 is coupled to data store 120 and includes, without limitation, geometry generation module 220, layout generation module 222, metric generation module 224, evaluation module 226, and evaluation results 228.

In one or more embodiments, design engine 118 obtains data describing requirements and constraints associated with generating building designs for the building from data store 120. Additionally, in some embodiments, design engine 118 may store generated data, such as building geometries, building layouts, metrics associated with a building geometry or building layout, and/or evaluation results, to data store 120. As shown in FIG. 2, data store 120 includes, without limitation, operation data 210, workspace data 212, geometry data 214, site data 216, and design data 218.

Operation data 210 includes data describing operations of the building. For example, data describing operations of a factory may include data indicating workstations, operators, personnel, schedules, zones, positions, tools, storage facilities, parts, materials, equipment, transport requirements or restrictions, or other elements and features associated with operations of the factory. Additionally, the data describing the factory operations may include data describing the elements and features associated with operations of the factory, such as weights of parts and materials. As another example, data describing operations of a workplace may include data indicating office spaces, desks, meeting rooms, common areas, amenities such as restrooms or breakrooms, staff, office personnel, schedules, zones, equipment, space requirements or restrictions, or other elements and features associated with the workplace. Additionally, the data describing the workplace operations may include data describing the elements and features associated with the workplace, such as the number of offices, desks, common areas, and amenities.

Workspace data 212 includes data describing workstations or workspaces of the building. For example, data describing a workstation may include data indicating one or more operations associated with the workstation, one or more operation tasks associated with the workstation, dimensions of the workstation, a shape of the workstation, or other information related to the workstation. As another example, data describing a workspace may include data indicating one or more personnel types associated with the workspace, one or more categories or functions associated with the workspace, a shape of the workspace, dimensions of the workspace, a type and number of elements associated with the workspace such as desks, tables, and seating, or other information related to the workspace. A workspace may generally refer to any defined space within the building, open or enclosed, for employees to perform work, such as a meeting room, office, group of desks, group of cubicles, and so forth.

Geometry data 214 includes data describing the building. For example, the data describing the building may include data indicating a size of the building, a shape of the building, a footprint of the building, an orientation of the building, structural elements of the building, fixed equipment within the building and locations of the fixed equipment, and infrastructure of the building such as loading docks, entrances, exits, and mechanical systems. In some embodiments, geometry data 214 includes a three-dimensional (3D) model of the building, a wireframe model of the building, a surface mesh of the building, a footprint of the building, a floorplan of the building, images or renders of the building from one or more views, and/or other visualizations of the building geometry. The geometry data 214 may be data that was generated by design engine 118, data received from another application or tool, data entered or otherwise provided by a user, or a combination thereof.

In some embodiments, geometry data 214 includes a layout indicating locations of workstations or workspaces within the budding. The layout may be generated by design engine 118, generated by another application or tool, or designed by a user. In some embodiments, design engine 118 generates the layout for the building based on information describing the building, such as operation data 210 and workspace data 212. In some embodiments, geometry data 214 includes one or more visualizations of the building, and the visualizations may include visualizations of workstations and workspaces within the building according to the layout.

Site data 216 includes data describing a site at which the building is to be constructed. For example, the data describing the site may include data indicating a location of the site, a size of the site, a shape of the site, an orientation of the site, fixed equipment within the site and locations of the fixed equipment, utilities around or underneath the site, topography of the site, elevation(s) of the site, soil conditions of the site, restriction(s) on the site, and infrastructure of the site such as roads and paths.

Additionally, in some embodiments, site data 216 may include data describing one or more adjacent sites. For example, data describing an adjacent site may include data indicating a location of the adjacent site, a relative location of the adjacent site with respect to the site, a size of the adjacent site, a shape of the adjacent site, an orientation of the adjacent site, fixed equipment within the adjacent site and locations of the fixed equipment, utilities around or underneath the adjacent site, topography of the adjacent site, elevation(s) of the adjacent site, soil conditions of the adjacent site, restriction(s) on the adjacent site, infrastructure of the adjacent site such as roads and paths. Additionally, in some embodiments, the data describing the adjacent site may include data indicating one or more costs associated with the adjacent site, such as zoning costs, permitting costs, purchasing costs, and so forth.

Design data 218 includes data associated with one or more designs of the building. For example, data describing a building design may include restrictions and requirements associated with the building design, such as production requirements (e.g. number of workstations, number of production bays, target production rate, target production efficiency), workspace requirements (e.g., number of desks, number of common areas and amenities, number of meeting rooms), building size requirements, capacity requirements, infrastructure requirements, system requirements, accessibility requirements, architectural and engineering constraints, and so forth.

In some embodiments, design data 218 includes data describing materials associated with the building design, such as windows, doors, cladding, piping and plumbing types and sizes, wiring types and sizes, and mechanical systems such as heating, ventilation and air conditioning (HVAC) systems. The data describing the materials may include estimated costs for each material.

In some embodiments, design data 218 includes data describing one or more sustainability certification systems. For example, data describing a sustainability certification system may include one or more locations associated with the sustainability certification system, one or more types of buildings associated with the sustainability certification system, one or more certification levels or ratings of the sustainability certification system, scores corresponding to the certification levels or ratings, scoring or rubric information for the sustainability certification system, one or more sustainability areas or categories associated with the sustainability certification system, and so forth. Additionally, in some embodiments, the data describing the sustainability areas or categories may include data describing one or more locations associated with the sustainability area or category, one or more types of buildings associated with the sustainability area or category, one or more qualification elements associated with the sustainability area or category, scoring or rubric information for the sustainability area or category, and so forth.

In operation, geometry generation module 220 receives site data 216 and design data 218 from data store 120 and generates a building geometry 230. Building geometry 230 indicates the size and shape of the building. In some embodiments, generating building geometry 230 includes generating a visualization of the building geometry, such as a 2D footprint of the building and/or a 3D model of the building. In some embodiments, building geometry 230 also indicates a placement of the building within the site, such as location and orientation of the budding on the site.

Layout generation module 222 receives operation data 210 and workspace data 212, and generates a layout 240 associated with the building (also referred to herein as "building layout 240"). Layout 240 indicates locations within a building, such as a factory, for a plurality of workstations or workspaces of the building. In some embodiments, layout 240 also indicates locations within the building of other rooms or elements of the building, such as storage facilities, tools, supplies, entrances, exits, elevators, stairs, material transport paths or structures, or other rooms or elements used by factory or workplace operations. In one or more embodiments, generating the layout 240 is based on a pre-defined building geometry, such as building geometry 230 and/or geometry data 214. Layout generation module 222 receives building geometry 230 and/or geometry data 214, and determines locations for the workstations, workspaces, and other rooms or elements of the building within the boundaries of the building indicated by the pre-defined geometry.

Metric generation module 224 receives building geometry 230 and/or building layout 240 and generates one or more metrics 250 associated with the building design based on the building geometry 230 and/or the building layout 240. In some embodiments, metric generation module 224 also receives one or more of operation data 210, workspace data 212, geometry data 214, site data 216, or design data 218, and generating the one or more metrics 250 is further based on the received data.

In some embodiments, each metric 250 corresponds to a particular design goal for the building, such as minimizing construction cost, target square footage, lot efficiency goals, production goals, productivity goals, occupancy or capacity goals, energy usage targets, ventilation and air flow targets, maximizing or minimizing light exposure, workflow or operational efficiency goals, sustainability goals, and so forth. Each metric 250 may be a value or measurement associated with the corresponding design goal.

Metric 250 includes one or more sustainability certification values that correspond to sustainability certification design goals. A sustainability certification value indicates an estimated sustainability certification level corresponding to a sustainability certification system or an estimated sustainability certification score corresponding to a sustainability certification system. As shown, metric generation module 224 includes sustainability certification value generator 260 for generating the one or more sustainability certification values.

Sustainability certification value generator 260 generates the one or more sustainability certification values based on a building design for a building, such as a factory or workplace. The building design specifies various aspects of the design of the building, such as building geometry, interior layout, building construction materials, the site on which the building is to be constructed, and so forth.

In one or more embodiments, the building design includes a geometry of the building. Sustainability certification value generator 260 receives a building geometry 230 and generates the one or more sustainability certification values based on the building geometry. The building geometry may be a building geometry generated by geometry generation module 220, a building geometry generated by another application or tool, or a building geometry received from data store 120. The building geometry 230 indicates a size and shape of the building. In some embodiments, the building geometry 230 includes a visualization of the building geometry, such as a 2D footprint of the building and/or a 3D model of the building. Additionally, in some embodiments, the building geometry 230 indicates a placement of the building within the site, such as location and orientation of the building on the site.

In one or more embodiments, the building design includes a layout of the building. Sustainability certification value generator 260 receives a building layout 240 and generates the one or more sustainability certification values based on the building layout. The building layout may be a layout generated by layout generation module 222, a layout generated by another application or tool, or a layout received from data store 120. The building layout 240 indicates the locations within the building of workspaces or workstations of the building. In some embodiments, the building layout 240 also indicates locations within the building of other rooms or elements of the building, such as storage facilities, tools, supplies, entrances, exits, elevators, stairs, material transport paths or structures, or other rooms or elements used by factory or workplace operations.

In one or more embodiments, the building design includes the site on which the building is to be constructed. Sustainability certification value generator 260 receives site data 216 and generates the one or more sustainability certification values based on the site data. The data describing the site may include a location of the site, a size of the site, a shape of the site, and an orientation of the site, fixed equipment within the site and locations of the fixed equipment, utilities around or underneath the site, topography of the site, elevation(s) of the site, soil conditions of the site, restriction(s) on the site, and infrastructure of the site such as roads and paths. Additionally, in some embodiments, the data describing the site may include data describing one or more adjacent sites. The site data may be received from data store 120, from another application or data source, or from a user via user input.

In one or more embodiments, the building design includes materials associated with the building, such as windows, doors, cladding, piping and plumbing types and sizes, wiring types and sizes, and mechanical systems such as heating, ventilation and air conditioning (HVAC) systems. Sustainability certification value generator 260 receives design data 218 and generates the one or more sustainability certification values based on the design data. The design data may be received from data store 120, from another application or data source, or from a user via user input. Additionally, design data 218 may include estimated costs for each material and/or costs associated with each material.

In one or more embodiments, design data 218 includes data describing one or more sustainability certification systems. The design data 218 may include, for example, locations associated with each sustainability certification system, types of buildings associated with each sustainability certification system, certification levels or ratings for each sustainability certification system, scores corresponding to the certification levels or ratings, scoring or rubric information for each sustainability certification system, sustainability areas or categories associated with each sustainability certification system, and other information related to the sustainability certification systems. Sustainability certification value generator 260 generates the one or more sustainability certification values based on the data describing the one or more sustainability certification systems.

In one or more embodiments, to generate the one or more sustainability certification values, sustainability certification value generator 260 selects one or more sustainability certification systems for assessing the building design. A sustainability certification system is a rating system that is used to assess a building's performance in terms of sustainability and/or environmental performance. Each sustainability certification system may use a different set of criteria for assessing the building design.

In some embodiments, selecting the one or more sustainability certification systems is based on design data associated with the building. Sustainability certification value generator 260 receives design data 218, including data describing the one or more sustainability certification systems, Sustainability certification value generator 260 selects the one or more sustainability certification systems described by design data 218, In one or more embodiments, design data 218 includes data describing a plurality of sustainability certification systems, and sustainability certification value generator 260 selects a subset of sustainability certification systems from the plurality of sustainability certification systems described by design data 218.

In some embodiments, selecting the one or more sustainability certification systems is further based on a location of the building. For example, each sustainability certification system may be associated with one or more locations or areas, such as one or more regions, countries, states or provinces, and so forth. Sustainability certification value generator 260 determines the location of the building and selects one or more particular sustainability certification systems associated with the location of the building. In some embodiments, the location of the building may be indicated by data stored in data store 120, such as in site data 216 or design data 218. Sustainability certification value generator 260 receives the data from data store 120 and determines the location of the building based on the received data.

In some embodiments, selecting the one or more sustainability certification systems is further based on the type of building. For example, each sustainability certification system may be associated with one or more particular types of buildings of a plurality of types of buildings. Sustainability certification value generator 260 determines the type of building and selects the one or more particular sustainability certification systems associated with the type of building. In some embodiments, the type of building may be indicated by data stored in data store 120, such as in operation data 210 or design data 218. In some embodiments, sustainability certification value generator 260 may receive and analyze data associated with the building, e.g. operation data 210, workspace data 212, geometry data 214, and building layout 240, to determine the type of building. For example, sustainability certification value generator 260 may determine the building type based on operations associated with the building, the types of employees associated with the building, the types of workspaces or workstations in the building, and so forth.

Additionally, in some embodiments, selecting the one or more sustainability certification systems may be based on user input specifying one or more particular sustainability certification systems from a plurality of sustainability certification systems.

In some embodiments, after selecting the one or more sustainability certification systems, sustainability certification value generator 260 assesses, for each sustainability certification system, the building design based on the sustainability certification system. Sustainability certification value generator 260 generates, based on assessing the building design based on the sustainability certification system, a sustainability certification value for the sustainability certification system. In some embodiments, the sustainability certification value indicates the estimated sustainability certification score for the sustainability certification system. In some embodiments, the sustainability certification value indicates the estimated sustainability certification level achieved for the sustainability certification system.

In one or more embodiments, sustainability certification value generator 260 assesses the budding design based on a sustainability certification system by determining one or more sustainability areas associated with the sustainability certification system. Each sustainability area is particular category, of a plurality of categories associated with the sustainability certification system, under which the building design is evaluated. A sustainability area may be based on, for example, building location, transportation, sustainable sites, water usage, energy usage, atmosphere, pollution, materials and resources, chemicals, hazards, indoor environment quality, innovation, waste, land use, environmental impact, and so forth. In some embodiments, sustainability certification value generator 260 determines the one or more sustainability areas based on design data 216 indicating the one or more sustainability areas associated with the sustainability certification system.

For each sustainability area, sustainability certification value generator 260 determines one or more qualification elements associated with the sustainability area. For example, each sustainability area may be associated with a respective scoring system or rubric. The scoring system or rubric may specify one or more qualification elements for evaluating the building design. Each qualification element is a requirement or specification relating to an aspect of the sustainability area. For example, a qualification element may be whether the building design uses certain types of fixtures or materials; whether the building design uses a certain quantity or threshold quantity of a fixture or material; whether the building design avoids using certain types of fixtures or materials; whether the building is close to or includes certain features, amenities, infrastructure, or transportation options; and so forth. Additionally, a sustainability area may be associated with one or more pre-requisite qualification elements. A pre-requisite qualification element is a qualification element that must be satisfied before the remaining qualification elements may be evaluated. In some embodiments, sustainability certification value generator 260 determines the one or more qualification elements based on design data 216 indicating the one or more qualification elements associated with the sustainability area.

After determining the one or more qualification elements associated with the sustainability area, sustainability certification value generator 260 evaluates the building design based on each qualification element of the one or more qualification elements. In one or more embodiments, evaluating the building design based on a qualification element includes determining whether the building design satisfies the requirement(s) or specification(s) specified by the qualification element.

In one or more embodiments, the one or more qualification elements includes one or more pre-requisite qualification elements. Evaluating the building design based on the one or more qualification elements includes determining whether the building design satisfies the requirement(s) or specification(s) specified by the one or more pre-requisite qualification elements. If sustainability certification value generator 260 determines that the building design does not satisfy the one or more pre-requisite qualification elements, sustainability certification value generator 260 may skip evaluating the building design based on the remaining qualification elements, or may automatically determine that the building design does not satisfy the remaining qualification elements.

In one or more embodiments, sustainability certification value generator 260 generates, for each qualification element of the one or more qualification elements, a respective element value. The respective element value is a score associated with the qualification element. The score for a qualification element may be determined based on whether or how much the building design satisfies the qualification element, and the rubric or scoring system associated with the sustainability area.

For example, the rubric or scoring system associated with the sustainability area may indicate that, for a first qualification element, if the building design satisfies the qualification element then the score associated with the qualification element should be a 1, and if the building design does not satisfy the qualification element then the score should be a 0. In response to determining that the building design satisfies the first qualification element, sustainability certification value generator 260 generates an element value of 1 for the first qualification element.

As another example, a second qualification element may specify a particular type of fixture. The rubric or scoring system associated with the sustainability area may indicate that, for the second qualification element, if the amount of the particular type of fixture included in the building design falls within a first range, then the score associated with the qualification element should be 5; if the amount falls within a second range, then the score should be 4; and so forth. In response to determining the amount of the particular type of fixture included in the building design, sustainability certification value generator 260 generates an element value based on the corresponding range in which the amount falls.

In some embodiments, evaluating the building design based on a qualification element includes sending and/or receiving data to and/or from one or more other tools, applications, modules, and such. For example, determining whether the building design satisfies the qualification element may include calculating one or more metrics or measurements, such as energy usage, airflow, ventilation, light exposure, views from the building, and so forth. The one or more other tools, applications, and modules may be configured to generate the one or more metrics or measurements. Sustainability certification value generator 260 receives the one or more metrics or measurements from the corresponding tool, application, or module. Additionally, sustainability certification value generator 260 may provide building design data needed for the calculation(s) to the one or more tools, applications, and modules.

In one or more embodiments, one or more other elements of metric generation module 224 may be configured to perform the calculations for generating the one or more metrics or measurements. Sustainability certification value generator 260 may receive the one or more metrics or measurements from the one or more other elements of metric generation module 224. In some embodiments, metric generation module 224 may store metrics and measurements to data store 120. Sustainability certification value generator 260 may receive previously generated metrics from data store 120.

Sustainability certification value generator 260 calculates a respective score for each sustainability area based on evaluating the budding design based on the one or more qualification elements associated with each sustainability area. For example, sustainability certification value generator 260 may calculate a respective score for a sustainability area based on a number of qualification elements satisfied by the building design. As another example, sustainability certification value generator 260 may calculate the respective score for a sustainability area by aggregating the element scores for the one or more qualification elements associated with the sustainability area. In some embodiments, the method by which sustainability certification value generator 260 calculates the respective scores may vary depending on the particular sustainability area and the particular sustainability certification system. Sustainability certification value generator 260 may determine, based on the rubric or scoring system associated with the sustainability area, the method for calculating the respective score for the sustainability area.

In some embodiments, sustainability certification value generator 260 calculates a sustainability certification value indicating a sustainability certification score for the building design based on the sustainability certification system. Sustainability certification value generator 260 calculates the sustainability certification score for the sustainability certification system based on the respective scores for the one or more sustainability areas of the sustainability certification system. For example, sustainability certification value generator 260 may calculate the sustainability certification score by aggregating the respective scores for the one or more sustainability areas. In some embodiments, the method by which sustainability certification value generator 260 calculates the sustainability certification score may vary depending on the particular sustainability certification system. Sustainability certification value generator 260 may determine, based on the rubric or scoring system associated with the sustainability certification system, the method for calculating the sustainability certification score for the sustainability certification system.

In some embodiments, sustainability certification value generator 260 calculates a sustainability certification value indicating a sustainability certification level for the building design based on the sustainability certification system. Sustainability certification value generator 260 determines a sustainability certification level for the building design based on the sustainability certification score. Calculating the sustainability certification score may be performed in a manner similar to that discussed above. Sustainability certification value generator 260 may determine, based on the rubric or scoring system associated with the sustainability certification system, the sustainability certification level corresponding to the sustainability certification score.

Additionally, in some embodiments, sustainability certification value generator 260 determines an overall cost associated with the building design. The overall cost may be based on, for example, costs associated with materials included in the building design and estimated construction costs associated with the building design. In some embodiments, sustainability certification value generator 260 calculates the overall cost associated with the building design. In other embodiments, sustainability certification value generator 260 receives the overall cost from a different tool, application, or module that performed the calculation(s).

Evaluation module 226 receives the metrics 250, including the one or more sustainability certification values and the overall cost for the building design, and analyzes the metrics 250 to generate evaluation results 228. In some embodiments, the evaluation results 228 indicate, based on the metrics 250, how well or whether a building design satisfies one or more design goals. The design goals may include pre-defined goals and/or goals specified in design data 218, such as requirements of the building design.

In some embodiments, design engine 118 generate an interactive graphical user interface (GUI) that depicts the various analyses performed and the evaluation results 228 generated by the various analyses, and displays the GUI to the end user. Additionally, the GUI may depict one or more of a visualization of the building geometry 230, a visualization of the building layout 240, or the metrics 250.

In some embodiments, design engine 118 generates a plurality of budding designs and the GUI depicts evaluation results, metrics, and visualizations corresponding to each building design of the plurality of building designs. This allows an end user to quickly view and compare metrics and evaluation results across several potential budding designs generated by the design engine 118. For example, a user may use the GUI to quickly compare both the sustainability certification level achieved by the potential building designs and the overall costs associated with the potential building designs to identify one or more building designs that achieve the highest sustainability certification level while maintaining the lowest overall cost. Additionally, the GUI may include tools for searching, filtering, and/or sorting the plurality of building designs. For example, a user may interact with the GUI to identify building designs that satisfy a particular design criteria.

In some embodiments, the evaluation results 228 are provided back to geometry generation module 220 and/or layout generation module 222 for iterating on or optimizing building geometry 230 and/or building layout 240. Based on the evaluation results 228, geometry generation module 220 and/or layout generation module 222 repeat the geometry generation and/or layout generation procedure with input parameters varied according to the evaluation results.

In one or more embodiments, design engine 118 determines one or more adjustments to the building design based on the evaluation results 228. For example, the evaluation results 228 may indicate changes, e.g. building geometry 230, building layout 240, and/or building materials, that can be made to the building design to increase the sustainability certification score and/or sustainability certification level for a particular sustainability certification system. Design engine 118 may select and apply one or more of the changes to the building design to generate one or more alternate building designs. In one or more embodiments, geometry generation module 220 applies one or more changes to the building design by adjusting or changing the size and/or shape of the building. In one or more embodiments, layout generation module 222 applies one or more changes to the building design by adjusting or changing the locations of rooms or other elements within the building and/or the quantity of rooms or other elements within the building. In one or more embodiments, design engine 118 applies one or more changes to budding materials by modifying or updating the design data 218 stored in data store 120.

In this manner, geometry generation module 220 and layout generation module 222 may perform any number of different iterations until a collection of building designs are generated that meet the one or more design goals, that meet a threshold number of the one or more design goals, or meet the each of the one or more design goals to a threshold degree. After the collection of building designs are generated, design engine 118 may generate a GUI that depicts evaluation results, metrics, and/or visualizations corresponding to each building design of the collection of building designs, and display the GUI to the user.

Figure 3:
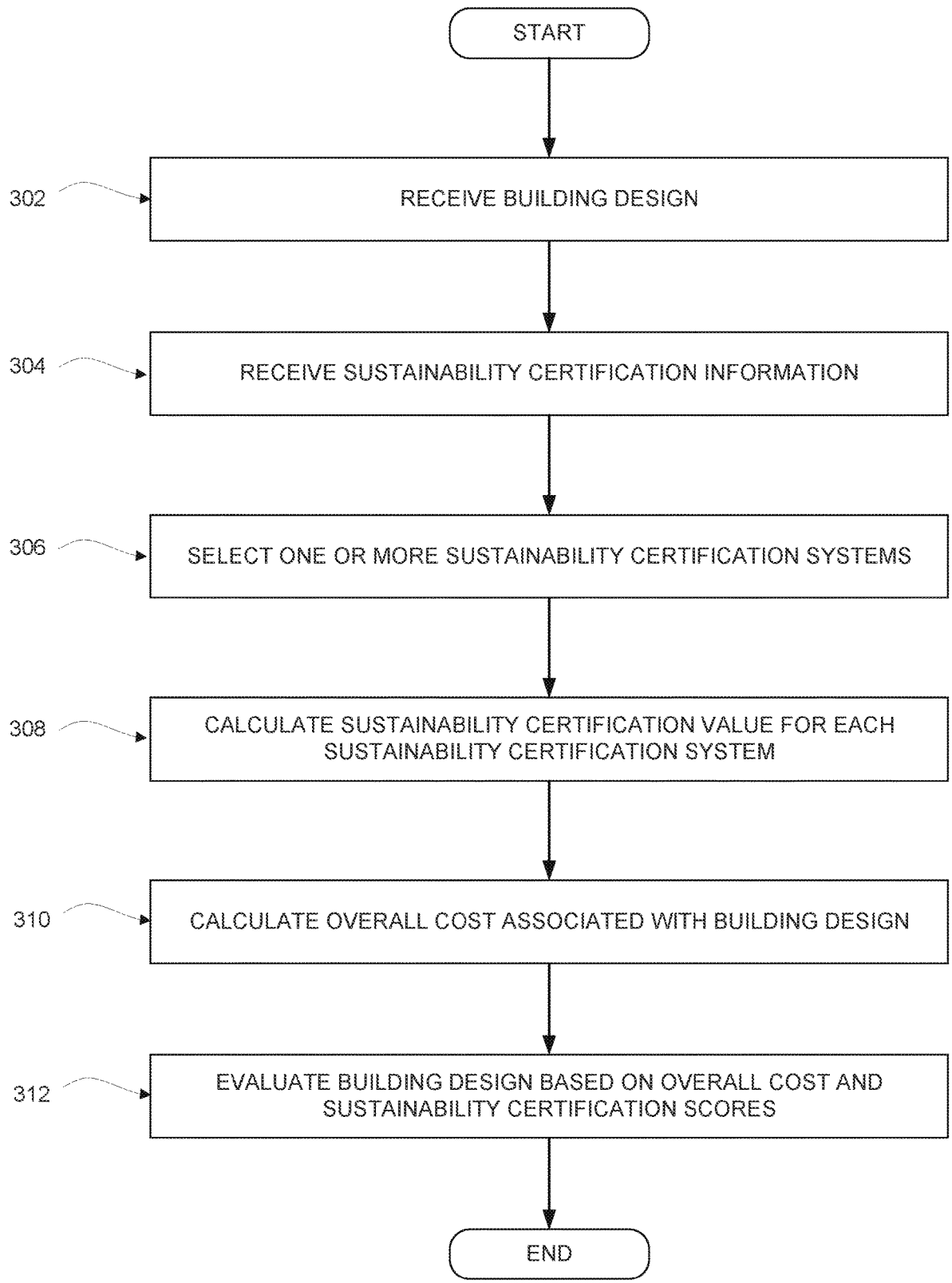
FIG. 3 is a flowchart of method steps for sustainability certification evaluation performed by the design engine of FIG. 1, according to various embodiments of the present disclosure.

FIG. 3 is a flowchart of method steps for sustainability certification evaluation performed by the design engine 118 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 302, sustainability certification value generator 260 receives a building design, including a building geometry 230, a building layout 240, and building materials. In one or more embodiments, sustainability certification value generator 260 receives the building geometry 230 from geometry generation module 220, the building layout 240 from layout generation module 222, and building material information from data store 120. In some embodiments, sustainability certification value generator 260 also receives site data 216 from data store 120.

In step 304, sustainability certification value generator 260 receives sustainability certification information describing a plurality of sustainability certification systems. In one or more embodiments, sustainability certification value generator 260 receives the sustainability certification information from data store 120.

In step 306, sustainability certification value generator 260 selects one or more sustainability certification systems, from the plurality of sustainability certification systems, for assessing the budding design. Selecting the one or more sustainability certification systems is performed in a manner similar to that disclosed above with respect to sustainability certification value generator 260. In one or more embodiments, selecting the one or more sustainability certification systems is based on one or more of: design data associated with the building, a location of the building, the type of budding, or user input specifying sustainability certification systems.

In step 308, for each sustainability certification system of the one or more sustainability certification systems, sustainability certification value generator 260 calculates a respective sustainability certification value. Calculating the respective sustainability certification value is performed in a manner similar to that disclosed above with respect to sustainability certification value generator 260, and as further described below with regards to FIG. 4. In one or more embodiments, sustainability certification value generator 260 assesses, for each sustainability certification system, the building design based on the sustainability certification system. Sustainability certification value generator 260 generates, based on assessing the building design based on the sustainability certification system, a sustainability certification value for the sustainability certification system. In some embodiments, the sustainability certification value indicates the estimated sustainability certification score for the sustainability certification system. In some embodiments, the sustainability certification value indicates the estimated sustainability certification level achieved for the sustainability certification system.

In some embodiments, sustainability certification value generator 260 calculates a sustainability certification value indicating a sustainability certification score for the building design based on the sustainability certification system. Sustainability certification value generator 260 may calculate the sustainability certification score for the sustainability certification system based on one or more sustainability areas of the sustainability certification system. For example, sustainability certification value generator 260 may calculate the sustainability certification score by aggregating respective scores for the one or more sustainability areas. In some embodiments, the particular method by which sustainability certification value generator 260 calculates the sustainability certification score may vary depending on the particular sustainability certification system. Sustainability certification value generator 260 may determine, based on a rubric or scoring system associated with each sustainability certification system, a method for calculating the sustainability certification score for the sustainability certification system.

In some embodiments, sustainability certification value generator 260 calculates a sustainability certification value indicating a sustainability certification level for the building design based on the sustainability certification system. Sustainability certification value generator 260 calculates a sustainability certification score for the building design based on the sustainability certification system, and determines a sustainability certification level for the building design based on the sustainability certification score. In some embodiments, sustainability certification value generator 260 determines, based on a rubric or scoring system associated with each sustainability certification system, a sustainability certification level corresponding to the sustainability certification score.

In step 308, design engine 118 calculates an overall cost associated with the building design. Calculating the overall cost is performed in a manner similar to that disclosed above with respect to sustainability certification value generator 260 and design engine 118. In some embodiments, design engine 118 determines the materials included in the building design and costs associated with the materials included in the building design, and calculates the overall cost based on the materials included in the building design and the associated costs of assembly and construction.

In step 310, design engine 118 evaluates the building design based on the sustainability certification values for the one or more sustainability certification systems. Additionally, design engine 118 may evaluate the building design further based on the overall cost associated with the building design. Evaluating the building design is performed in a manner similar to that disclosed above with respect to design engine 118 and evaluation module 226. In one or more embodiments, evaluating the building design based on the sustainability certification values includes analyzing the sustainability certification values to generate evaluation results 228 that indicate how well or whether the building satisfies sustainability certification design goals. In one or more embodiments, evaluating the building design based on the sustainability certification values includes generating a GUI that depicts the sustainability certification values and displays the GUI to an end user. In one or more embodiments, evaluating the building design based on the sustainability certification values includes determining one or more changes or adjustments to the building design, based on the sustainability certification values, and applying the one or more changes or adjustments to the building design.

Figure 4:
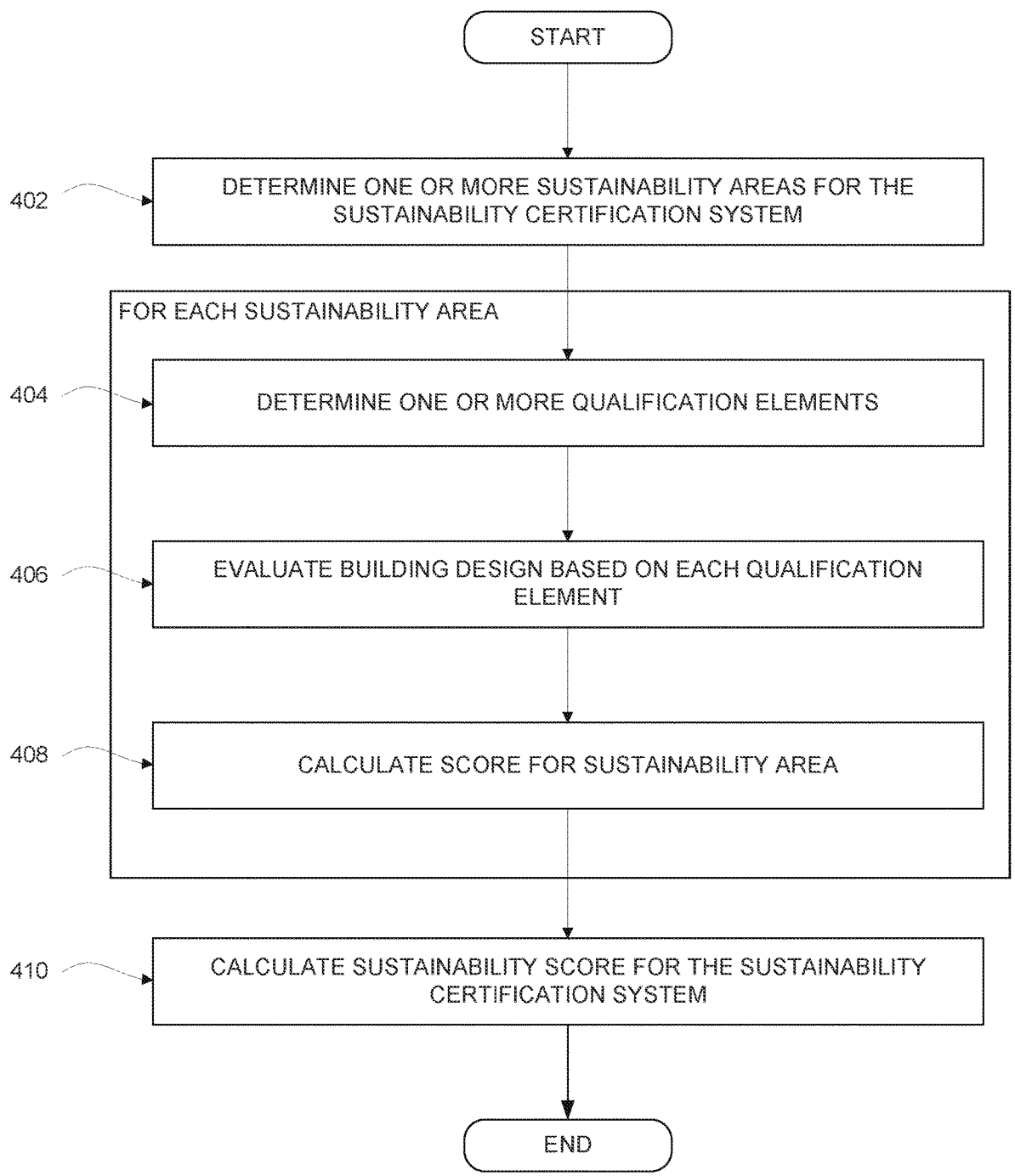
FIG. 4 is a flowchart of method steps for sustainability certification value calculation performed by the design engine of FIG. 1, according to various embodiments of the present disclosure.

FIG. 4 is a flowchart of method steps for sustainability certification value calculation for a sustainability certification system, performed by the design engine 118 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 402, sustainability certification value generator 260 determines one or more sustainability areas associated with a sustainability certification system. Determining the one or more sustainability areas is performed in a manner similar to that disclosed above with respect to sustainability certification value generator 260, In some embodiments, sustainability certification value generator 260 determines the one or more sustainability areas based on design data 216 indicating the one or more sustainability areas associated with the sustainability certification system.

In step 404, sustainability certification value generator 260 determines, for each sustainability area of the one or more sustainability areas, one or more qualification elements associated with the sustainability area. Determining the one or more qualification elements is performed in a manner similar to that disclose above with respect to sustainability certification value generator 260. In some embodiments, each sustainability area is associated with a respective scoring system or rubric. The scoring system or rubric specifies one or more qualification elements for evaluating the budding design. Each qualification element is a requirement or specification relating to an aspect of the sustainability area. In some embodiments, sustainability certification value generator 260 determines the one or more qualification elements based on design data 216 indicating the one or more qualification elements associated with the sustainability area.

In step 406, for each sustainability area of the one or more sustainability areas, sustainability certification value generator 260 evaluates the building design based on each qualification element of the one or more qualification elements associated with the sustainability area. Evaluating the building design based on a qualification element is performed in a manner similar to that disclosed above with respect to sustainability certification value generator 260.

In one or more embodiments, evaluating the building design based on a qualification element includes determining whether the building design satisfies the requirement(s) or specification(s) specified by the qualification element.

In one or more embodiments, the one or more qualification elements includes one or more pre-requisite qualification elements. Evaluating the building design based on the one or more qualification elements includes determining whether the building design satisfies the requirement(s) or specification(s) specified by the one or more pre-requisite qualification elements. In some embodiments, if sustainability certification value generator 260 determines that the building design does not satisfy the one or more pre-requisite qualification elements, sustainability certification value generator 260 avoids evaluating the building design based on the remaining qualification elements. In some embodiments, if sustainability certification value generator 260 determines that the building design does not satisfy the one or more pre-requisite qualification elements, sustainability certification value generator 260 automatically determines that the building design does not satisfy the remaining qualification elements.

In one or more embodiments, sustainability certification value generator 260 generates, for each qualification element of the one or more qualification elements, a respective element value. The respective element value is a score associated with the qualification element. The score for a qualification element may be determined based on whether or how much the building design satisfies the qualification element, and the rubric or scoring system associated with the sustainability area.

In some embodiments, evaluating the building design based on a qualification element includes sending and/or receiving data to and/or from one or more other tools, applications, modules, and such. Determining whether the building design satisfies the qualification element may include calculating one or more metrics or measurements, such as energy usage, airflow, ventilation, light exposure, views from the building, and so forth. The one or more other tools, applications, and modules may be configured to generate the one or more metrics or measurements. Sustainability certification value generator 260 receives the one or more metrics or measurements from the corresponding tool, application, or module. Additionally, in some embodiments, sustainability certification value generator 260 provides building design data needed for the calculation(s) to the one or more tools, applications, and modules.

In one or more embodiments, one or more other elements of metric generation module 224 may be configured to perform the calculations for generating the one or more metrics or measurements. Sustainability certification value generator 260 receives the one or more metrics or measurements from the one or more other elements of metric generation module 224. In some embodiments, metric generation module 224 stores metrics and measurements to data store 120. Sustainability certification value generator 260 receives the stored metrics and measurements from data store 120.

In step 408, sustainability certification value generator 260 calculates a respective score for each sustainability area of the one or more sustainability areas. Calculating the respective score for a sustainability area is performed in a manner similar to that disclosed above with respect to sustainability certification value generator 260. In one or more embodiments, sustainability certification value generator 260 calculates a respective score for the sustainability area based on a number of qualification elements satisfied by the budding design. In one or more embodiments, sustainability certification value generator 260 calculates the respective score for a sustainability area by aggregating the element scores for the one or more qualification elements associated with the sustainability area.

In some embodiments, the particular method by which sustainability certification value generator 260 calculates the respective scores may vary depending on the particular sustainability area and the particular sustainability certification system. Sustainability certification value generator 260 may determine, based on the rubric or scoring system associated with the sustainability area, the particular method for calculating the respective score for each sustainability area.

In step 410, sustainability certification value generator 260 calculates a sustainability certification score for the sustainability certification system. Calculating the sustainability certification score is performed in a manner similar to that disclosed above with respect to sustainability certification value generator 260 and FIG. 3. In some embodiments, sustainability certification value generator 260 calculates the sustainability certification score for the sustainability certification system based on the respective scores for the one or more sustainability areas of the sustainability certification system. For example, certification value generator 260 may calculate the sustainability certification score by aggregating the respective scores for the one or more sustainability areas. In some embodiments, the particular method by which sustainability certification value generator 260 calculates the sustainability certification score may vary depending on the particular sustainability certification system. Sustainability certification value generator 260 may determine, based on a rubric or scoring system associated with each sustainability certification system, the particular method for calculating the sustainability certification score for the sustainability certification system.

In sum, the computer system receives input data describing the building and one or more sustainability certification systems, and generates sustainability certification values that indicate estimated sustainability certification levels corresponding to the one or more sustainability certification systems.

In one approach, the computer system determines, for each certification system of the one or more sustainability certification systems, one or more qualification elements associated with the sustainability certification system. For each qualification element of the one or more qualification element, the computer system determines whether the building design satisfies the qualification element based on the input data describing the building. The computer system calculates, based on the qualification elements satisfied by the building design, a sustainability certification score and/ or a sustainability certification level associated with the sustainability certification system, for the building design.

Additionally, in some approaches, the computer system computes an overall cost associated with the building design based on the input data describing the building. The input data describing the building may include, for example, materials used in the building, systems used in the building, building shape, building size, and layout of elements within the building.

At least one advantage of the disclosed techniques is that given a design option, the computer system is able to generate output indicating tradeoffs between overall building cost and sustainability scores for different certification standards. Unlike typical approaches for analyzing a building design that involve individually evaluating select aspects related to sustainability, this approach allows quick analysis and comparison of sustainability certification levels and building costs for the building design. A user can utilize the generated measurements to further optimize potential building designs and quickly see how different adjustments to the design affect building cost and sustainability certification scores.

Furthermore, this approach may be used as part of a design application that iteratively generates improved layouts that meet specific design objectives. The generated output can be provided to the design application for iterating and/or optimizing on a budding design. For example, the design application may utilize the sustainability certification values and overall cost as one of several metrics when evaluating different layouts. Multiple budding designs may equally satisfy other design objectives, but each design may be associated with different sustainability certification levels and/or building costs. As another example, the design application may utilize data indicating which qualification elements were satisfied by a building design to generate building designs that satisfy additional qualification elements. Accordingly, these technical advantages provide one or more technological advancements over prior art approaches.

1. In various embodiments, a computer-implemented method for computationally evaluating sustainability of building designs comprises receiving a building design for a building and sustainability certification data describing a plurality of sustainability certification systems, selecting one or more particular sustainability certification systems from the plurality of sustainability certification systems, computing a respective sustainability certification value for each sustainability certification system of the one or more particular sustainability certification systems, and performing one or more building design operations based on sustainability certification system values for the one or more particular sustainability certification systems.

2. The method of clause 1, where selecting the one or more particular sustainability certification systems is based on one or more of: design data associated with the building, a location of the building, or a building type of the building.

3. The method of clause 1 or 2, where the respective sustainability certification value corresponds to a sustainability certification score for the sustainability certification system.

4. The method of any of clauses 1-3, where the respective sustainability certification value corresponds to a sustainability certification level for the sustainability certification system.

5. The method of any of clauses 1-4, where computing the respective sustainability certification value includes determining one or more sustainability areas associated with the sustainability certification system, and computing, for each sustainability area of the one or more sustainability areas, a respective score, where computing the respective sustainability certification value is based on the respective scores for the one or more sustainability areas.

6. The method of any of clauses 1-5, where computing the respective score includes determining one or more qualification elements associated with the sustainability area, and for each qualification element of the one or more qualification elements, evaluating the building design based on the qualification element.

7. The method of any of clauses 1-6, where computing the respective score further includes for each qualification element of the one or more qualification elements, generating a respective element score based on the evaluating the building design, and where computing the respective score is based on the respective scores for the one or more qualification elements.

8. The method of any of clauses 1-7, where a first building design operation included in the one or more building design operations comprises adjusting a building geometry of the building to generate one or more alternate building designs.

9. The method of any of clauses 1-8, where a first building design operation included in the one or more building design operations comprises adjusting a building layout of the building to generate one or more alternate building designs.

10. The method of any of clauses 1-9, where a first building design operation included in the one or more building design operations comprises adjusting building materials of the building to generate one or more alternate building designs.

11. In various embodiments, one or more non-transitory computer readable media store instructions that, when executed by one or more processors, cause the one or more processors to perform the steps of receiving a building design for a building and sustainability certification data describing a plurality of sustainability certification systems, selecting one or more particular sustainability certification systems from the plurality of sustainability certification systems, computing a respective sustainability certification value for each sustainability certification system of the one or more particular sustainability certification systems, and performing one or more budding design operations based on sustainability certification system values for the one or more particular sustainability certification systems.

12. The one or more non-transitory computer readable media of clause 11, where selecting the one or more particular sustainability certification systems is based on one or more of: design data associated with the building, a location of the building, or a building type of the building.

13. The one or more non-transitory computer readable media of clause 11 or 12, where the respective sustainability certification value corresponds to a sustainability certification score for the sustainability certification system.

14. The one or more non-transitory computer readable media of any of clauses 11-13, where the respective sustainability certification value corresponds to a sustainability certification level for the sustainability certification system.

15. The one or more non-transitory computer readable media of any of clauses 11-14, where computing the respective sustainability certification value includes determining one or more sustainability areas associated with the sustainability certification system, and computing, for each sustainability area of the one or more sustainability areas, a respective score, where computing the respective sustainability certification value is based on the respective scores for the one or more sustainability areas.

16. The one or more non-transitory computer readable media of any of clauses 11-15, where computing the respective score includes determining one or more qualification elements associated with the sustainability area, for each qualification element of the one or more qualification elements, evaluating the building design based on the qualification element.

17. The one or more non-transitory computer readable media of any of clauses 11-16, where computing the respective score further includes for each qualification element of the one or more qualification elements, generating a respective element score based on the evaluating the building design, and where computing the respective score is based on the respective scores for the one or more qualification elements.

18. The one or more non-transitory computer readable media of any of clauses 11-17, where a first building design operation included in the one or more building design operations comprises adjusting a building geometry of the building to generate one or more alternate building designs.

19. In various embodiments, a system comprises a memory storing instructions, and one or more processors for executing the instructions to receive a building design for a building and sustainability certification data describing a plurality of sustainability certification systems, select one or more particular sustainability certification systems from the plurality of sustainability certification systems, compute a respective sustainability certification value for each sustainability certification system of the one or more particular sustainability certification systems, and perform one or more building design operations based on sustainability certification system values for the one or more particular sustainability certification systems.

20. The computer system of clause 19, where selecting the one or more particular sustainability certification systems is based on one or more of: design data associated with the building, a location of the building, or a building type of the building.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computationally evaluating sustainability of building designs, the method comprising:
   receiving design data for a building design and sustainability certification data describing a plurality of sustainability certification systems that are applicable to a location of the building design, wherein, for each sustainability certification system included in the plurality of sustainability certification systems, the sustainability certification data includes a plurality of sustainability categories, and, for each category included in the plurality of sustainability categories, the sustainability certification data includes:
      a plurality of certification levels or ratings for the sustainability category, and
      a plurality of scores corresponding to the plurality of certification levels or ratings;
   selecting, based on one or more attributes of the building design included in the design data, one or more particular sustainability certification systems from the plurality of sustainability certification systems;
   computing a respective sustainability certification value for each sustainability certification system of the one or more particular sustainability certification systems; and
   performing one or more building design operations based on sustainability certification values for the one or more particular sustainability certification systems.

2. The method of claim 1, wherein the one or more attributes of the building design comprise one or more of: a location of the building design or a building type of the building design.

3. The method of claim 1, wherein the respective sustainability certification value corresponds to a sustainability certification score for the sustainability certification system.

4. The method of claim 1, wherein the respective sustainability certification value corresponds to a sustainability certification level for the sustainability certification system.

5. The method of claim 1, wherein computing the respective sustainability certification value includes:
   determining one or more sustainability categories associated with the sustainability certification system, and
   computing, for each sustainability category of the one or more sustainability categories, a respective score,
   wherein computing the respective sustainability certification value is based on the respective scores for the one or more sustainability categories.

6. The method of claim 5, wherein computing the respective score includes:
   determining one or more qualification elements associated with the sustainability category, and
   for each qualification element of the one or more qualification elements, evaluating the building design based on the qualification element.

7. The method of claim 6, wherein computing the respective score further includes for each qualification element of the one or more qualification elements, generating a respective element score based on the evaluating the building design, and wherein computing the respective score is based on the respective scores for the one or more qualification elements.

8. The method of claim 1, wherein a first building design operation included in the one or more building design operations comprises adjusting a building geometry of the building design to generate one or more alternate building designs.

9. The method of claim 1, wherein a first building design operation included in the one or more building design operations comprises adjusting a building layout of the building design to generate one or more alternate building designs.

10. The method of claim 1, wherein a first building design operation included in the one or more building design operations comprises adjusting building materials of the building design to generate one or more alternate building designs.

11. One or more non-transitory computer readable media storing instructions that, when executed by one or more processors, cause the one or more processors to perform the steps of:
   receiving design data for a building design and sustainability certification data describing a plurality of sustainability certification systems that are applicable to a location of the building design, wherein, for each sustainability certification system included in the plurality of sustainability certification systems, the sustainability certification data includes a plurality of sustainability categories, and, for each category included in the plurality of sustainability categories, the sustainability certification data includes:
- a plurality of certification levels or ratings for the sustainability category, and
- a plurality of scores corresponding to the plurality of certification levels or ratings;

selecting, based on one or more attributes of the building design included in the design data, one or more particular sustainability certification systems from the plurality of sustainability certification systems;

computing a respective sustainability certification value for each sustainability certification system of the one or more particular sustainability certification systems; and performing one or more building design operations based on sustainability certification values for the one or more particular sustainability certification systems.

12. The one or more non-transitory computer readable media of claim 11, wherein the one or more attributes of the building design comprise one or more of: a location of the building design or a building type of the building design.

13. The one or more non-transitory computer readable media of claim 11, wherein the respective sustainability certification value corresponds to a sustainability certification score for the sustainability certification system.

14. The one or more non-transitory computer readable media of claim 11, wherein the respective sustainability certification value corresponds to a sustainability certification level for the sustainability certification system.

15. The one or more non-transitory computer readable media of claim 11, wherein computing the respective sustainability certification value includes:
- determining one or more sustainability categories associated with the sustainability certification system, and
- computing, for each sustainability category of the one or more sustainability categories, a respective score,
- wherein computing the respective sustainability certification value is based on the respective scores for the one or more sustainability categories.

16. The one or more non-transitory computer readable media of claim 15, wherein computing the respective score includes:
- determining one or more qualification elements associated with the sustainability category, and
- for each qualification element of the one or more qualification elements, evaluating the building design based on the qualification element.

17. The one or more non-transitory computer readable media of claim 16, wherein computing the respective score further includes for each qualification element of the one or more qualification elements, generating a respective element score based on the evaluating the building design, and wherein computing the respective score is based on the respective scores for the one or more qualification elements.

18. The one or more non-transitory computer readable media of claim 11, wherein a first building design operation included in the one or more building design operations comprises adjusting a building geometry of the building design to generate one or more alternate building designs.

19. A system, comprising:
- a memory storing instructions; and
- one or more processors for executing the instructions to:
  - receive design data for a building design and sustainability certification data describing a plurality of sustainability certification systems that are applicable to a location of the building design, wherein, for each sustainability certification system included in the plurality of sustainability certification systems, the sustainability certification data includes a plurality of sustainability categories, and, for each category included in the plurality of sustainability categories, the sustainability certification data includes:
    - a plurality of certification levels or ratings for the sustainability category, and
    - a plurality of scores corresponding to the plurality of certification levels or ratings;
  - select, based on one or more attributes of the building design included in the design data, one or more particular sustainability certification systems from the plurality of sustainability certification systems;
  - compute a respective sustainability certification value for each sustainability certification system of the one or more particular sustainability certification systems; and
  - perform one or more building design operations based on sustainability certification values for the one or more particular sustainability certification systems.

20. The computer system of claim 19, wherein the one or more attributes of the building design comprise one or more of: a location of the building design or a building type of the building design.

21. The method of claim 1, further comprising receiving a first user input via a graphical user interface, wherein the selecting the one or more particular sustainability certification systems from the plurality of sustainability certification systems is further based on the first user input.

22. The one or more non-transitory computer readable media of claim 11, wherein the instructions further cause the one or more processors to perform the steps of:
- displaying a plurality of designs generated based on the one or more building design operations via a graphical user interface; and
- receiving a first user input via the graphical user interface that performs at least one of searching, filtering, or sorting the plurality of designs.

23. The computer system of claim 19, wherein the one or more processors execute the instructions to perform the further steps of:
- evaluating a plurality of designs generated based on the one or more building design operations to generate one or more evaluation results; and
- generating an interactive graphical user interface that depicts the one or more evaluation results.

* * * * *